United States Patent [19]
Nguyen

[11] Patent Number: 5,865,495
[45] Date of Patent: Feb. 2, 1999

[54] NET TAILGATE

[76] Inventor: Dung Nguyen, 2500 E. Centennial Rd., Lot 234, Bismarck, N. Dak. 58501

[21] Appl. No.: 976,945

[22] Filed: Nov. 24, 1997

[51] Int. Cl.⁶ .................................................. B62D 33/033
[52] U.S. Cl. .......................................... 296/50; 296/180.1
[58] Field of Search ..................................... 296/50, 180.1

[56] References Cited

U.S. PATENT DOCUMENTS

| | | | |
|---|---|---|---|
| 4,750,777 | 6/1988 | Brammer | 296/50 |
| 4,932,705 | 6/1990 | Miller | 296/50 |
| 5,533,773 | 7/1996 | Lessick | 296/50 |
| 5,542,591 | 8/1996 | Moore et al. | 296/50 |

*Primary Examiner*—Gary C. Hoge
*Attorney, Agent, or Firm*—Michael S. Neustel

[57] ABSTRACT

A net tailgate for providing a flexible ventilated tailgate which allows a fifth-wheel trailer to connected to a pickup without having to remove the tailgate. The inventive device includes a foldable frame having a V-shaped cutout, a netting attached to and enclosing the frame, and four securing straps which are attachable to a box of a pickup. A cutout cover is removably attachable about the V-shaped cutout by a plurality of fasteners. The foldable frame provides structural support around the V-shaped cutout thereby preventing the netting from flapping around when the pickup is traveling at high speeds.

20 Claims, 2 Drawing Sheets

NET TAILGATE

BACKGROUND OF THE INVENTION

1. Field of the Invention

The present invention relates generally to ventilated tailgate devices and more specifically it relates to a net tailgate for providing a flexible ventilated tailgate which allows a fifth-wheel trailer to connected to a pickup without having to remove the tailgate.

Conventional net tailgates are constructed from nylon, vinyl or similar fabric. The fabric chosen for the convention net tailgates preferably has flaccid characteristics thereby allowing them to be easily stored when not needed. Further, the flaccid characteristics reduce the chance that the cargo will be damaged if it should come into contact with the tailgate. However, since the conventional net tailgates are flaccid, an central opening for receiving the hitch portion of a fifth-wheeler trailer has not been utilized for obvious reasons. Therefore, there has become a need for a net tailgate which has the desired flaccid characteristics of prior net tailgates and which has a central opening for receiving the hitch portion of the fifth-wheeler trailer.

2. Description of the Prior Art

There are numerous ventilated tailgate devices. For example, U.S. Pat. No. 5,597,195; U.S. Pat. No. 5,605,367; U.S. Pat. No. 5,605,367; U.S. Pat. No. 5,393,115; U.S. Pat. No. 5,411,312; Design U.S. Pat. No. 344,259; Design U.S. Pat. No. 353,126 to all are illustrative of such prior art.

While these devices may be suitable for the particular purpose to which they address, they are not as suitable for providing a flexible ventilated tailgate which allows a fifth-wheel trailer to connected to a pickup without having to remove the tailgate. None of the prior art teaches a ventilated net tailgate which has an opening for receiving a hitch of a fifth-wheeler trailer.

In these respects, the net tailgate according to the present invention substantially departs from the conventional concepts and designs of the prior art, and in so doing provides an apparatus primarily developed for the purpose of providing a flexible ventilated tailgate which allows a fifth-wheel trailer to connected to a pickup without having to remove the tailgate.

SUMMARY OF THE INVENTION

A primary object of the present invention is to provide a net tailgate that will overcome the shortcomings of the prior art devices.

Another object is to provide a net tailgate that has an opening for receiving the hitch of a fifth-wheeler gooseneck trailer.

An additional object is to provide a net tailgate that is constructed from a flaccid material so as to reduce damage to cargo within a pickup.

A further object is to provide a net tailgate that is foldable into a compact storage position.

Another object is to provide a net tailgate that allows air to flow there through thereby increasing fuel efficiency of a pickup.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
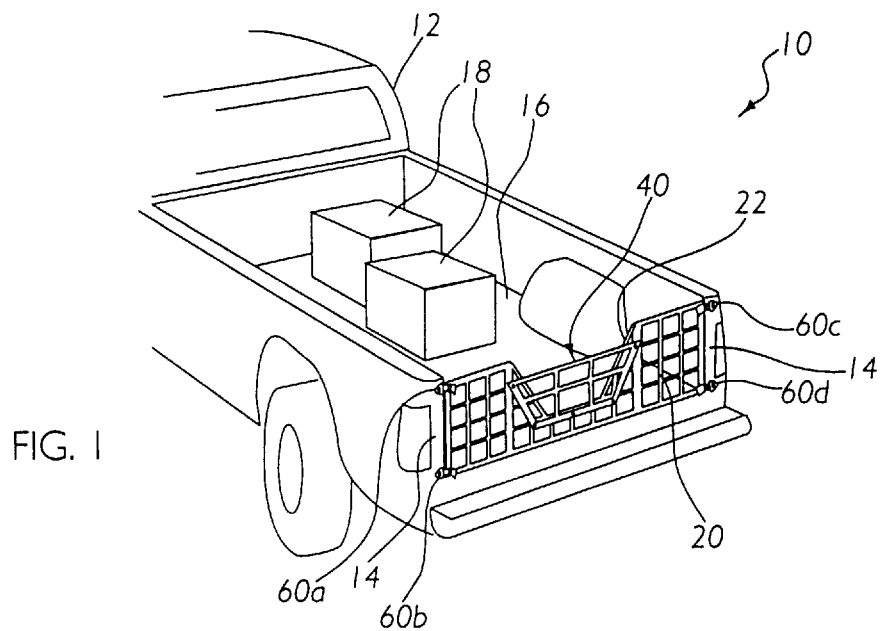
FIG. 1 is an upper perspective view of the present invention attached to a pickup box.

Turning now descriptively to the drawings, in which similar reference characters denote similar elements throughout the several view, FIGS. 1 through 4 illustrate a net tailgate 10, which comprises a foldable frame 30 having a V-shaped cutout 22, a netting 20 attached to and enclosing the frame 30, and four adjusting straps 50a–d which are attachable to a box of a pickup 12. A cutout cover 40 is removably attachable about the V-shaped cutout 22 by a plurality of fasteners 42 for preventing cargo 18 within the bed 16 from accidentally escaping through the V-shaped cutout 22 when the unnumbered gooseneck trailer is not attached.

Figure 2:
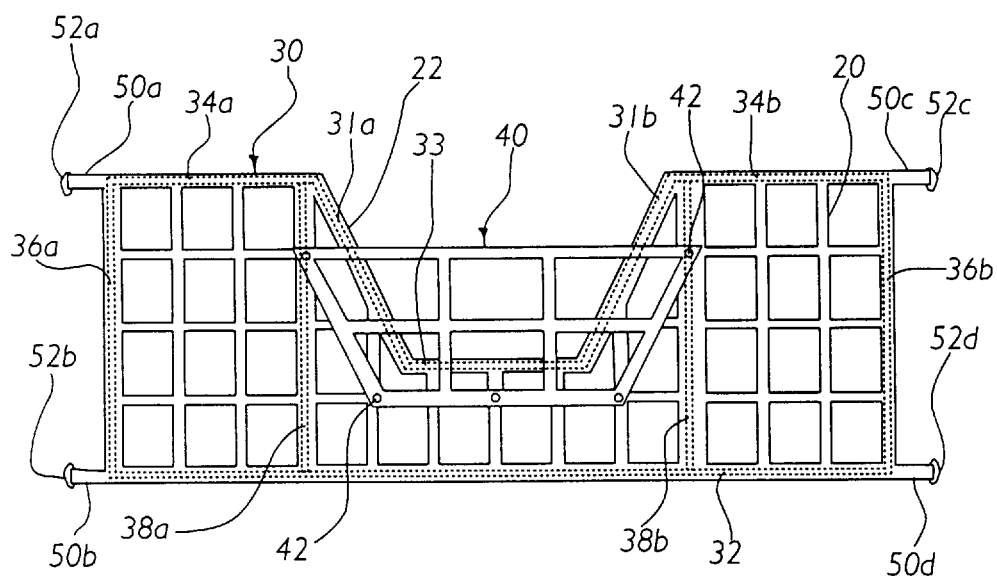
FIG. 2 is a rear view of the present invention.
Figure 3:
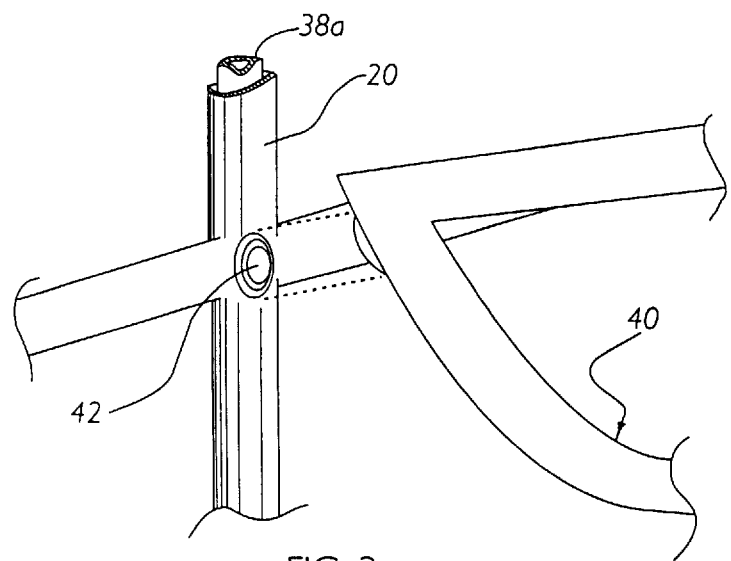
FIG. 3 is a magnified upper perspective cut-away view of the present invention along with the cutout cover.
Figure 4:
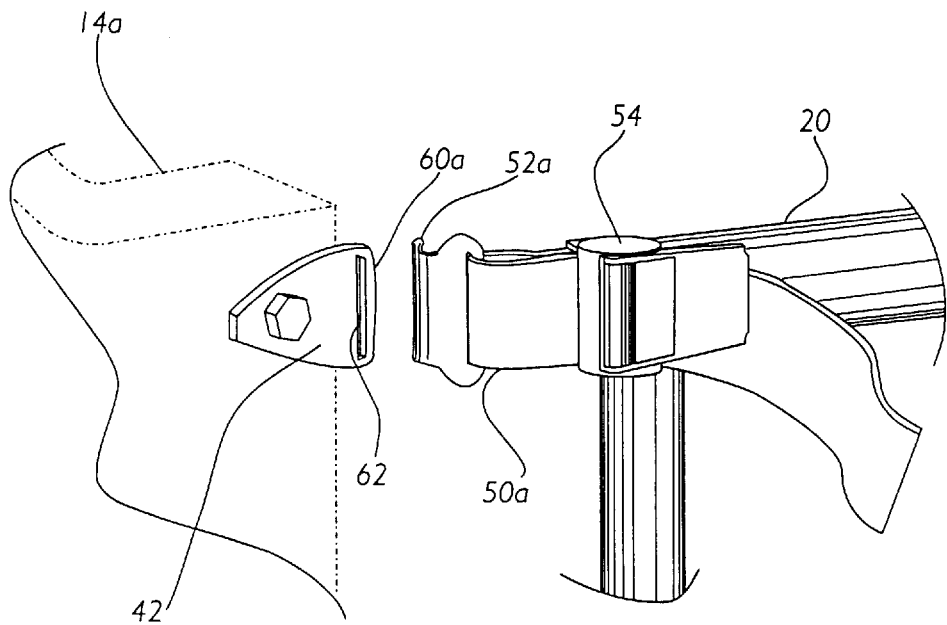
FIG. 4 is an upper perspective view of the securing means.

As shown in FIGS. 1 and 2, the netting 20 is preferably rectangular shaped with a reticulated structure. The V-shaped cutout 22 projects downwardly into a central upper portion of the netting 20 to approximately ⅓ the distance from the bottom of the netting 20. The netting 20 is constructed from a flaccid material such as nylon or vinyl for reducing the chance of damaging cargo 18 within the bed 16 of the pickup 12. As shown in FIG. 2, the netting 20 completely surrounds the foldable frame 30. A cutout cover 40 is fastenable around the V-shaped cutout 22 by a plurality of fasteners 42 as shown in FIGS. 1 through 3 of the drawings. The cutout cover 40 is preferably reticulated in a design similar to the reticulated design of the netting 20. The cutout cover 40 prevents cargo 18 within the bed 16 of the pickup 12 from accidentally falling out.

As best shown in FIG. 2 of the drawings, the foldable frame 30 is positioned within the netting 20. The foldable frame 30 comprises a pair of opposing side members 36a–b which are vertically orientated when the present invention is attached to the box of the pickup 12. A bottom member 32 is positioned within a lower portion of the netting 20 as shown in FIG. 2 between the pair of side members 36a–b. A pair of top members 34a–b are positioned within upper opposing portions of the netting 20 as shown in FIG. 2. The top members 34a–b are substantially orthogonal to and adjacent to the side members 36a–b. A pair of inner members 38a–b are vertically aligned opposite of one another within the netting 20 as shown in FIG. 2. An upper end of the inner members 38a–b is adjacent to a distal end of the top members 34a–b. A lower end of the inner members 38a–b is adjacent to the bottom member 32. A pair of angled members 31a–b are positioned within the netting 20 along the V-shaped cutout 22 as shown in FIG. 2, adjacent to the distal ends of the top members 34a–b. A central member 33 is positioned within the netting 20 between the distal ends of the angled members 31a–b for increasing the strength of the netting 20 around the V-shaped cutout 22. Alternatively, the components of the foldable frame 30 are pivotally attached to one another utilizing a hinge. In a third embodiment, the some components of the frame 30 are rigidly connected to one another with some components pivotally connected thereby increasing the strength of the central portion of the netting 20.

A pair of lower adjustable straps 50b, 50d are attached to a lower portion of the netting 20 opposite of one another as shown in FIG. 2. A pair of upper adjustable straps 50a, 50c are attached to an upper portion of the netting 20 opposite of one another as shown in FIG. 2. An adjusting member 54 is attached about each of the adjustable straps 50a–d for allowing adjustment of the length of the adjustable straps 50a–d. A corresponding clip 52a–d is attached to the distal end of each adjustable strap 50a–d for engagement with a corresponding bracket 60a–d. Each corresponding bracket 60a–d is attached to a rear edge 14 of the pickup 12 as shown in FIG. 1 of the drawings. Each bracket 60a–d has a slot 62 for receiving the corresponding clip 52a–d for tensioning the netting 20 between the pair of rear edges 14 of the pickup 12.

In use, the user installs the present invention between a pair of rear edges 14 of the bed 16 of the pickup 12 by engaging each clip 52a–d to a corresponding bracket 60a–d. The user then manually manipulates the adjusting member so as to tension the adjustable straps 50a–d and the netting 20 between the pair of rear edges 14. When the unnumbered gooseneck trailer is attached within the bed 16 of the pickup 12, the cutout cover 40 is removed to allow free movement within the V-shaped cutout 22. The foldable frame 30 provides support around the V-shaped cutout 22 of the netting 20 thereby preventing the netting 20 from flapping around from the associated air movement. The foldable frame 30 also provides the desirable rigid characteristics for preventing the netting 20 from expanding from air forces and other forces during travel, thereby reducing the chance of losing valuable cargo 18 during travel as associated within conventional net tailgates while retaining the desirable flaccid characteristics of the netting 20 for preventing damage to the cargo 18 and users. When the unnumbered gooseneck trailer is not attached, the cutout cover 40 is reinstalled using the fasteners 42 for preventing the cargo 18 from accidentally escaping. The netting 20 allows air to flow through the reticulated structure thereby increasing fuel efficiency of the pickup 12.

When the user desires to have the present invention removed, the adjusting members 54 are simply manipulated to loosen the adjustable straps 50a–d. The clips 52a–d are removed from the corresponding brackets 60a–d, where after the netting 20 and foldable frame 30 are folded into a compact storage position. The user then may store the present invention behind a seat or other convenient storage place until he or she requires its use again.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A net tailgate, comprising:

a foldable frame having an upper edge and a lower edge;

a netting surrounding said frame;

an attaching means for removably attaching said netting and said frame to a pair of opposing rear edges of a pickup; and wherein said frame includes a cutout projecting through and from said upper edge into a central portion of said frame for receiving a hitch portion of a gooseneck trailer.

2. The net tailgate of claim 1, including a cutout cover removably attachable to said netting by a securing means for selectively enclosing said cutout.

3. The net tailgate of claim 2, wherein said cutout is semi-hexogonal shaped.

4. The net tailgate of claim 3, wherein said frame comprises:

a pair of side members positioned adjacent to and parallel to said rear edges; and a bottom member extending between said side members adjacent said lower edge of said frame.

5. The net tailgate of claim 4, wherein said frame further comprises a pair of top members adjacent to and orthogonal to said side members.

6. The net tailgate of claim 5, wherein said frame further comprises a pair of angled members extending from a distal end of said top members downwardly along said cutout.

7. The net tailgate of claim 6, wherein said frame further comprises a central member extending between a distal end of said angled members along said cutout.

8. The net tailgate of claim 7, wherein said frame further comprises a pair of inner members extending vertically between said top members and said bottom member.

9. The net tailgate of claim 8, wherein said netting is comprised of nylon.

10. The net tailgate of claim 8, wherein said netting is comprised of vinyl.

11. The net tailgate of claim 9, wherein said netting is formed into a reticulated structure.

12. A net tailgate, comprising:

a foldable frame having an upper edge and a lower edge;

a netting surrounding said frame; and an attaching means for removably attaching said netting and said frame to a pair of opposing rear edges of a pickup.

13. The net tailgate of claim 12, wherein said frame includes a cutout projecting through and from said upper edge into a central portion of said frame for receiving a hitch portion of a gooseneck trailer.

14. The net tailgate of claim 13, including a cutout cover removably attachable to said netting by a securing means for selectively enclosing said cutout.

15. The net tailgate of claim 14, wherein said cutout is semi-hexagonal shaped.

16. The net tailgate of claim 15, wherein said frame comprises:
   a pair of side members positioned adjacent to and parallel to said rear edges; and
   a bottom member extending between said side members adjacent said lower edge of said frame.

17. The net tailgate of claim 16, wherein said frame further comprises a pair of top members adjacent to and orthogonal to said side members.

18. The net tailgate of claim 17, wherein said frame further comprises a pair of angled members extending from a distal end of said top members downwardly along said cutout.

19. The net tailgate of claim 18, wherein said frame further comprises a central member extending between a distal end of said angled members along said cutout.

20. The net tailgate of claim 19, wherein said frame further comprises a pair of inner members extending vertically between said top members and said bottom member.

\* \* \* \* \*